(12) United States Patent
Hildebrand et al.

(10) Patent No.: US 10,062,044 B2
(45) Date of Patent: Aug. 28, 2018

(54) METHOD AND SYSTEM FOR PRIORITIZING AND ALLOCATING WELL OPERATING TASKS

(71) Applicant: Schlumberger Technology Corporation, Sugar Land, TX (US)

(72) Inventors: Ginger Hildebrand, Houston, TX (US); Chunling Gu Coffman, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 437 days.

(21) Appl. No.: 14/682,056

(22) Filed: Apr. 8, 2015

(65) Prior Publication Data

US 2015/0294258 A1 Oct. 15, 2015

Related U.S. Application Data

(60) Provisional application No. 61/978,832, filed on Apr. 12, 2014.

(51) Int. Cl.
| | |
|---|---|
| *G06Q 10/06* | (2012.01) |
| *E21B 7/04* | (2006.01) |
| *E21B 7/10* | (2006.01) |
| *E21B 45/00* | (2006.01) |

(52) U.S. Cl.
CPC ......... *G06Q 10/06312* (2013.01); *E21B 7/04* (2013.01); *E21B 7/10* (2013.01); *E21B 45/00* (2013.01); *G06Q 10/063114* (2013.01)

(58) Field of Classification Search
None
See application file for complete search history.

(56) References Cited

U.S. PATENT DOCUMENTS

| | | | | | |
|---|---|---|---|---|---|
| 2,773,030 | A | * | 12/1956 | Tailleur | C09K 8/04 507/116 |
| 4,549,431 | A | * | 10/1985 | Soeiinah | E21B 44/00 175/45 |
| 4,685,329 | A | * | 8/1987 | Burgess | E21B 12/02 175/39 |
| 4,715,452 | A | * | 12/1987 | Sheppard | E21B 7/04 175/61 |
| 4,794,534 | A | * | 12/1988 | Millheim | E21B 44/00 175/40 |
| 4,819,730 | A | * | 4/1989 | Williford | E21B 7/128 114/144 B |

(Continued)

OTHER PUBLICATIONS

Armageddon—Drilling FailureFinal Hour—YouTube, published Feb 18, 2008 https://www.youtube.com/watch?v=6sk5luljr1E.*

(Continued)

*Primary Examiner* — Octavian Rotaru

(57) ABSTRACT

A method for managing well construction operations includes accepting as input to a computer a list of tasks required to complete construction of at least one wellbore, the list of tasks having at least an initial chronological order. Measurements of at least one parameter related to at least one task on the list of tasks is entered into the computer. The list of tasks is prioritized by at least one of changing a chronological order of performance or a length of time to complete at least one of the tasks based on measurements of the at least one parameter. The prioritizing is performed to optimize at least one well construction performance parameter. The prioritized list is displayed to at least one user of the computer.

18 Claims, 5 Drawing Sheets

(56) References Cited

U.S. PATENT DOCUMENTS

| | | | | |
|---|---|---|---|---|
| 4,852,399 A * | 8/1989 | Falconer | E21B 44/00 | 175/39 |
| 4,867,256 A * | 9/1989 | Snead | C02F 1/52 | 175/206 |
| 5,103,920 A * | 4/1992 | Patton | E21B 47/02216 | 175/45 |
| 5,273,112 A * | 12/1993 | Schultz | E21B 34/16 | 166/250.07 |
| 5,305,836 A * | 4/1994 | Holbrook | E21B 12/02 | 175/26 |
| 5,313,829 A * | 5/1994 | Paslay | G01H 1/00 | 166/250.01 |
| 5,368,108 A * | 11/1994 | Aldred | E21B 44/005 | 175/40 |
| 5,465,798 A * | 11/1995 | Edlund | E21B 44/00 | 175/24 |
| 5,660,239 A * | 8/1997 | Mueller | E21B 7/04 | 175/57 |
| 5,704,436 A * | 1/1998 | Smith | E21B 12/02 | 173/6 |
| 5,713,422 A * | 2/1998 | Dhindsa | E21B 19/08 | 173/4 |
| 5,725,059 A * | 3/1998 | Kuckes | E02D 31/006 | 175/45 |
| 5,730,234 A * | 3/1998 | Putot | E21B 44/00 | 175/50 |
| 5,812,068 A * | 9/1998 | Wisler | E21B 7/068 | 175/40 |
| 5,952,569 A * | 9/1999 | Jervis | E21B 44/00 | 166/250.01 |
| 5,955,666 A * | 9/1999 | Mullins | E21B 23/02 | 340/853.1 |
| 5,992,519 A * | 11/1999 | Ramakrishnan | E21B 43/00 | 166/250.01 |
| 6,002,985 A * | 12/1999 | Stephenson | E21B 43/00 | 702/13 |
| 6,012,015 A * | 1/2000 | Tubel | E21B 41/0035 | 702/6 |
| 6,021,377 A * | 2/2000 | Dubinsky | E21B 7/068 | 702/9 |
| 6,029,951 A * | 2/2000 | Guggari | B66D 1/485 | 173/11 |
| 6,044,325 A * | 3/2000 | Chakravarthy | G01V 3/28 | 702/7 |
| 6,169,967 B1 * | 1/2001 | Dahlem | E21B 10/00 | 702/11 |
| 6,233,498 B1 * | 5/2001 | King | E21B 44/00 | 700/174 |
| 6,237,404 B1 * | 5/2001 | Crary | E21B 44/00 | 175/40 |
| 6,349,595 B1 * | 2/2002 | Civolani | E21B 49/005 | 73/152.02 |
| 6,356,205 B1 * | 3/2002 | Salvo | G01N 33/18 | 210/143 |
| 6,382,331 B1 * | 5/2002 | Pinckard | E21B 44/00 | 175/27 |
| 6,424,919 B1 * | 7/2002 | Moran | E21B 44/00 | 702/6 |
| 6,438,495 B1 * | 8/2002 | Chau | E21B 7/04 | 702/9 |
| 6,443,242 B1 * | 9/2002 | Newman | E21B 44/00 | 166/381 |
| 6,516,293 B1 * | 2/2003 | Huang | E21B 10/16 | 175/331 |
| 6,549,879 B1 * | 4/2003 | Cullick | E21B 49/00 | 702/11 |
| 6,741,951 B2 * | 5/2004 | Whaling | G06Q 40/08 | 702/108 |
| 6,766,254 B1 * | 7/2004 | Bradford | E21B 44/00 | 367/73 |
| 6,785,641 B1 * | 8/2004 | Huang | E21B 10/00 | 175/45 |
| 6,807,486 B2 * | 10/2004 | Tobias | G01V 1/306 | 702/13 |
| 6,904,981 B2 * | 6/2005 | van Riet | E21B 21/08 | 166/265 |
| 7,032,689 B2 * | 4/2006 | Goldman | E21B 12/02 | 175/39 |
| 7,085,696 B2 * | 8/2006 | King | E21B 7/00 | 175/40 |
| 7,100,708 B2 * | 9/2006 | Koederitz | E21B 44/00 | 175/27 |
| 7,142,986 B2 * | 11/2006 | Moran | E21B 44/00 | 702/9 |
| 7,162,695 B2 * | 1/2007 | Zemore | G06Q 10/06 | 715/236 |
| 7,422,076 B2 * | 9/2008 | Koederitz | E21B 44/02 | 175/26 |
| 7,480,536 B2 * | 1/2009 | Kaufman | G06Q 90/00 | 340/439 |
| 7,584,165 B2 * | 9/2009 | Buchan | G06Q 10/06 | 706/60 |
| 7,698,148 B2 * | 4/2010 | Lavu | G06Q 10/0635 | 702/177 |
| 7,832,500 B2 * | 11/2010 | Garcia | E21B 47/12 | 175/24 |
| 7,840,394 B2 * | 11/2010 | Madatov | G01V 1/282 | 703/10 |
| 7,950,464 B2 * | 5/2011 | Atencio | E21B 43/00 | 166/250.01 |
| 8,145,462 B2 * | 3/2012 | Foucault | E21B 44/00 | 702/6 |
| 8,170,800 B2 * | 5/2012 | Aamodt | E21B 44/00 | 702/9 |
| 8,274,399 B2 * | 9/2012 | Strachan | G05B 13/048 | 340/853.6 |
| 8,554,717 B2 * | 10/2013 | Reckmann | E21B 41/00 | 706/61 |
| 8,670,966 B2 * | 3/2014 | Rashid | G06Q 10/04 | 166/245 |
| 8,676,721 B2 * | 3/2014 | Piovesan | G06Q 10/00 | 706/11 |
| 8,705,318 B2 * | 4/2014 | Zheng | G01V 1/42 | 175/24 |
| 8,794,353 B2 * | 8/2014 | Benson | E21B 7/04 | 175/24 |
| 8,812,334 B2 * | 8/2014 | Givens | G06Q 10/06 | 166/250.16 |
| 8,892,407 B2 * | 11/2014 | Budiman | E21B 47/04 | 703/10 |
| 9,103,936 B2 * | 8/2015 | Calleja | G01V 3/38 | |
| 9,127,530 B2 * | 9/2015 | Lowdon | E21B 47/02208 | |
| 9,175,557 B2 * | 11/2015 | Iversen | E21B 44/00 | |
| 9,316,053 B2 * | 4/2016 | Stacy, II | E21B 44/00 | |
| 9,316,100 B2 * | 4/2016 | Benson | E21B 47/00 | |
| 9,394,783 B2 * | 7/2016 | Rasmus | E21B 47/06 | |
| 9,404,327 B2 * | 8/2016 | Rasmus | G01V 9/00 | |
| 9,512,708 B2 * | 12/2016 | Hay | E21B 41/0092 | |
| 9,557,438 B2 * | 1/2017 | Wessling | G01V 11/002 | |
| 9,593,567 B2 * | 3/2017 | Pink | E21B 44/02 | |
| 9,638,830 B2 * | 5/2017 | Meyer | G01V 99/005 | |
| 2001/0050186 A1 * | 12/2001 | Wilson | B23Q 11/0046 | 175/38 |
| 2002/0103630 A1 * | 8/2002 | Aldred | E21B 44/00 | 703/10 |
| 2002/0112888 A1 * | 8/2002 | Leuchtenberg | E21B 21/08 | 175/48 |
| 2002/0161685 A1 * | 10/2002 | Dwinnell | G06Q 40/04 | 705/36 R |
| 2003/0015351 A1 * | 1/2003 | Goldman | E21B 12/02 | 175/39 |
| 2003/0220742 A1 * | 11/2003 | Niedermayr | E21B 44/00 | 702/9 |
| 2004/0000430 A1 * | 1/2004 | King | E21B 7/00 | 175/24 |
| 2004/0040746 A1 * | 3/2004 | Niedermayr | E21B 21/08 | 175/38 |

(56) References Cited

U.S. PATENT DOCUMENTS

| | | | |
|---|---|---|---|
| 2004/0124009 A1* | 7/2004 | Hoteit | E21B 44/00 175/25 |
| 2004/0195005 A1* | 10/2004 | Tsai | E21B 7/20 175/57 |
| 2004/0226748 A1* | 11/2004 | Prior | E21B 19/008 175/27 |
| 2005/0015229 A1* | 1/2005 | Huang | E21B 10/00 703/10 |
| 2005/0080595 A1* | 4/2005 | Huang | E21B 10/00 702/183 |
| 2005/0096847 A1* | 5/2005 | Huang | E21B 10/16 702/9 |
| 2005/0103491 A1* | 5/2005 | Newman | E21B 41/00 166/250.01 |
| 2005/0133272 A1* | 6/2005 | Huang | E21B 10/00 175/327 |
| 2005/0178551 A1* | 8/2005 | Tolman | E21B 17/203 166/297 |
| 2005/0209836 A1* | 9/2005 | Klumpen | G05B 19/41885 703/10 |
| 2005/0209912 A1* | 9/2005 | Veeningen | G06Q 10/06 705/7.12 |
| 2005/0236184 A1* | 10/2005 | Veeningen | E21B 10/00 175/40 |
| 2005/0267719 A1* | 12/2005 | Foucault | E21B 44/00 703/10 |
| 2006/0037781 A1* | 2/2006 | Leuchtenberg | E21B 21/08 175/25 |
| 2006/0162962 A1* | 7/2006 | Koederitz | E21B 45/00 175/27 |
| 2006/0167668 A1* | 7/2006 | Cariveau | E21B 10/00 703/7 |
| 2006/0180356 A1* | 8/2006 | Durairajan | E21B 10/42 175/431 |
| 2007/0056727 A1* | 3/2007 | Newman | E21B 41/00 166/250.01 |
| 2007/0056772 A1* | 3/2007 | Koederitz | E21B 7/28 175/53 |
| 2007/0199721 A1* | 8/2007 | Givens | G06Q 10/06 166/382 |
| 2008/0040084 A1* | 2/2008 | Huang | E21B 10/00 703/7 |
| 2008/0128334 A1* | 6/2008 | Scott | B01D 33/0315 209/309 |
| 2008/0162248 A1* | 7/2008 | Vachon | G06Q 10/06 705/7.13 |
| 2008/0208475 A1* | 8/2008 | Karr | E21B 47/00 702/6 |
| 2009/0063055 A1* | 3/2009 | Schneider | E21B 21/08 702/9 |
| 2009/0152005 A1* | 6/2009 | Chapman | E21B 7/00 175/24 |
| 2009/0157367 A1* | 6/2009 | Meyer | E21B 7/04 703/10 |
| 2009/0187384 A1* | 7/2009 | Nonaka | G06F 17/5004 703/1 |
| 2009/0188718 A1* | 7/2009 | Kaageson-Loe | E21B 21/003 175/40 |
| 2009/0200014 A1* | 8/2009 | Schottle | E21B 7/06 166/245 |
| 2009/0254569 A1* | 10/2009 | Paulk | G06Q 10/06 |
| 2010/0108381 A1* | 5/2010 | Sinnerstad | E21B 44/02 175/24 |
| 2010/0114493 A1* | 5/2010 | Vestal | E21B 41/00 702/9 |
| 2010/0250139 A1* | 9/2010 | Hobbs | E21B 47/12 702/6 |
| 2011/0015963 A1* | 1/2011 | Chafle | G06Q 10/06 705/7.16 |
| 2011/0017513 A1* | 1/2011 | Manttari | E21B 19/24 175/57 |
| 2011/0024195 A1* | 2/2011 | Hoyer | E21B 21/00 175/65 |
| 2011/0056750 A1* | 3/2011 | Lucon | E21B 7/24 175/56 |
| 2011/0071869 A1* | 3/2011 | O'Brien | G06Q 10/06 705/7.12 |
| 2011/0108323 A1* | 5/2011 | Stacy, II | E21B 21/00 175/24 |
| 2011/0161133 A1* | 6/2011 | Staveley | E21B 44/00 705/7.28 |
| 2011/0172976 A1* | 7/2011 | Budiman | E21B 47/022 703/2 |
| 2011/0220410 A1* | 9/2011 | Aldred | E21B 44/00 175/26 |
| 2011/0282630 A1* | 11/2011 | Rikkola | G05B 23/0232 702/184 |
| 2012/0117104 A1* | 5/2012 | Stundner | G06Q 10/00 707/769 |
| 2012/0118636 A1* | 5/2012 | Koederitz | E21B 44/00 175/24 |
| 2012/0123756 A1* | 5/2012 | Wang | E21B 44/00 703/2 |
| 2012/0138362 A1* | 6/2012 | Koederitz | E21B 44/00 175/26 |
| 2012/0166967 A1* | 6/2012 | Deimbacher | G06F 3/048 715/751 |
| 2012/0234549 A1* | 9/2012 | Lammertink | E21B 15/02 166/340 |
| 2012/0253518 A1* | 10/2012 | Stacy, II | E21B 44/00 700/275 |
| 2013/0025937 A1* | 1/2013 | Pilgrim | E21B 21/01 175/24 |
| 2013/0035919 A1* | 2/2013 | Al-Shammari | G06F 17/5009 703/10 |
| 2013/0035920 A1* | 2/2013 | Al-Shammari | E21B 43/12 703/10 |
| 2013/0043075 A1* | 2/2013 | Danko | E21B 4/06 175/57 |
| 2013/0118749 A1* | 5/2013 | Hannegan | E21B 21/00 166/305.1 |
| 2013/0146359 A1* | 6/2013 | Koederitz | G01V 3/38 175/48 |
| 2013/0220701 A1* | 8/2013 | Crowley | E21B 17/073 175/40 |
| 2013/0275047 A1* | 10/2013 | Selman | G01V 9/00 702/9 |
| 2014/0000964 A1* | 1/2014 | Selman | E21B 44/00 175/24 |
| 2014/0032192 A1* | 1/2014 | Zamora | E21B 44/00 703/10 |
| 2014/0083765 A1* | 3/2014 | Hoult | E21B 44/00 175/24 |
| 2014/0167954 A1* | 6/2014 | Johnson | G08B 27/001 340/539.11 |
| 2014/0209317 A1* | 7/2014 | Dirksen | E21B 41/00 166/369 |
| 2014/0284105 A1* | 9/2014 | Veltman | E21B 44/00 175/40 |
| 2015/0060146 A1* | 3/2015 | Brunelle | C09K 8/44 175/72 |
| 2015/0081221 A1* | 3/2015 | Mancini | E21B 44/00 702/9 |
| 2015/0107898 A1* | 4/2015 | Leuchtenberg | E21B 21/08 175/25 |
| 2015/0369030 A1* | 12/2015 | Hay | E21B 3/00 700/275 |

OTHER PUBLICATIONS

Drill string, wikipedia, archives org, Feb. 8, 2012 https://en.wikipedia.org/wiki/Drill_string.*

* cited by examiner

METHOD AND SYSTEM FOR PRIORITIZING AND ALLOCATING WELL OPERATING TASKS

CROSS-REFERENCE TO RELATED APPLICATIONS

Priority is claimed from U.S. Provisional Application No. 61/978,832 filed on Apr. 12, 2014.

STATEMENT REGARDING FEDERALLY SPONSORED RESEARCH OR DEVELOPMENT

Not applicable.

BACKGROUND

This disclosure is related to the field of construction and operation of wells drilled through subsurface formations. More specifically, the disclosure relates to methods and systems for automatically determining priority of well operating tasks and allocating prioritized tasks to a corresponding means for execution.

Well construction software programs known in the art generate a set of actions to be executed by various personnel. A generated set of actions may be displayed on a graphic user interface such as a computer display or may be printed. A set of actions generated by programs known in the art may include a linear operations workflow on a single well. Linear operations workflow in the present context may mean a set of operations performed successively in time.

Some well construction software programs known in the art generate warning signals when conditions in a well exist or are expected to exist that may have risk of adverse wellbore conditions that exceeds a selected threshold risk, but such programs typically only notify a user of potential or actual risk conditions exceeding the threshold. In such known software programs, the user determines actions or prioritizes suggested actions automatically generated by the software to correct the conditions that result in the above-threshold risk. The user of such programs also determines successive actions to be undertaken to advance the well construction process. When there are multiple causes of above-threshold risk and/or multiple possible actions to advance the well construction process, the user must exercise personal judgment to determine the task order and response action needed for each task.

Remote wellbore operation is typically performed by communicating measurements from a well construction site to a location having one or more computer systems operating software as described above. In computer systems known in the art executing such software, each well may have its own set of displays, e.g., on a graphic user interface. A wellbore operations person (e.g., a drilling engineer) remotely working on multiple wells often needs to open many different windows on many different display screens for each well. The number of displays could readily exceed the capacity of the person operating a multiple well computer system. In such cases it may be possible that key tasks are not instructed to be executed (e.g., communicated to well construction site personnel for execution at a drilling unit) in a timely manner or errors in selecting the task parameters may be made. Some multi-well operating parameter displays are known in the art, but they are not integrated with the well task execution for each well, and do not generate a list of instructions and supporting information to provide immediate decision support.

Single-well task generation software known in the art has not proven successful for aggregation of information and/or prioritization of actions to be taken on each of a plurality wells operating contemporaneously.

In certain well construction environments it may be desirable to reduce the number of people at the well construction site in order to reduce health, safety and environmental (HSE) exposure and operating costs. However, software known in the art that supports remote activities is substantially the same software designed for drilling unit site executed operations. Such software is designed to provide displays and input controls corresponding to the personnel who have been moved to a location away from the well construction site, but still requires the same personnel to interact with the well construction equipment, albeit remotely, such as measurement while drilling (MWD) measurement monitoring and reporting and directional drilling (DD), and such software is generally designed for single well operations.

DETAILED DESCRIPTION

Figure 2:
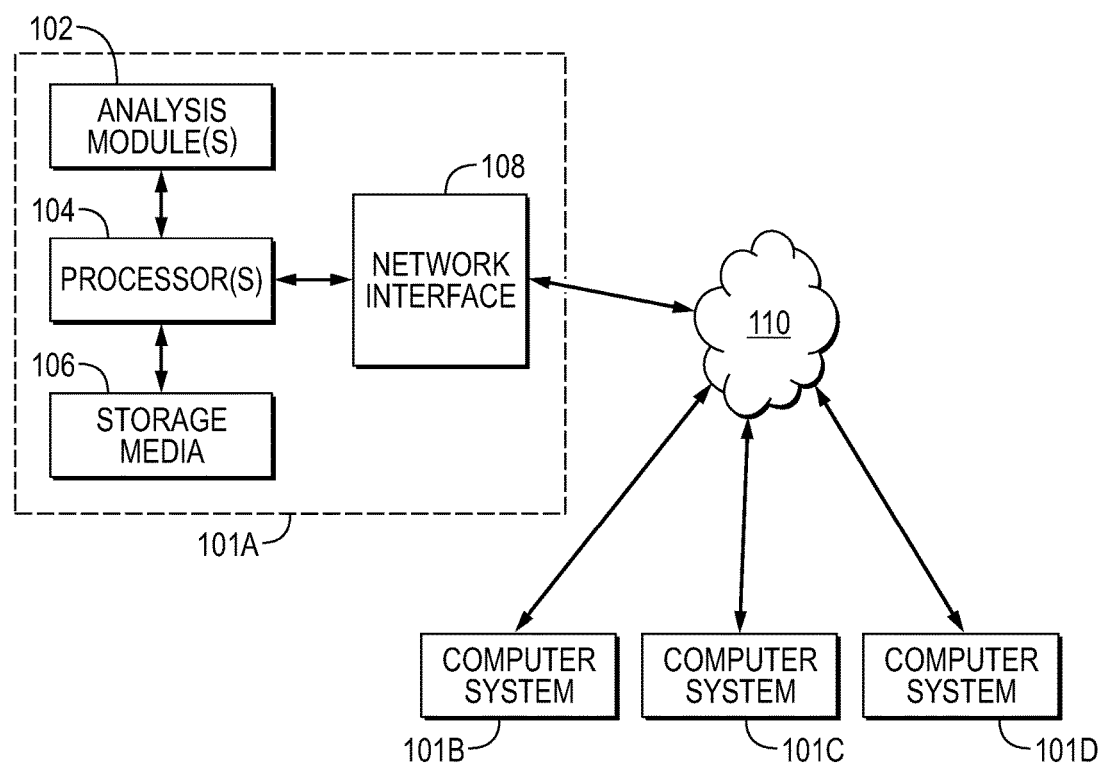
FIG. 2 shows an example computer system that may be used in some embodiments.
Figure 3:
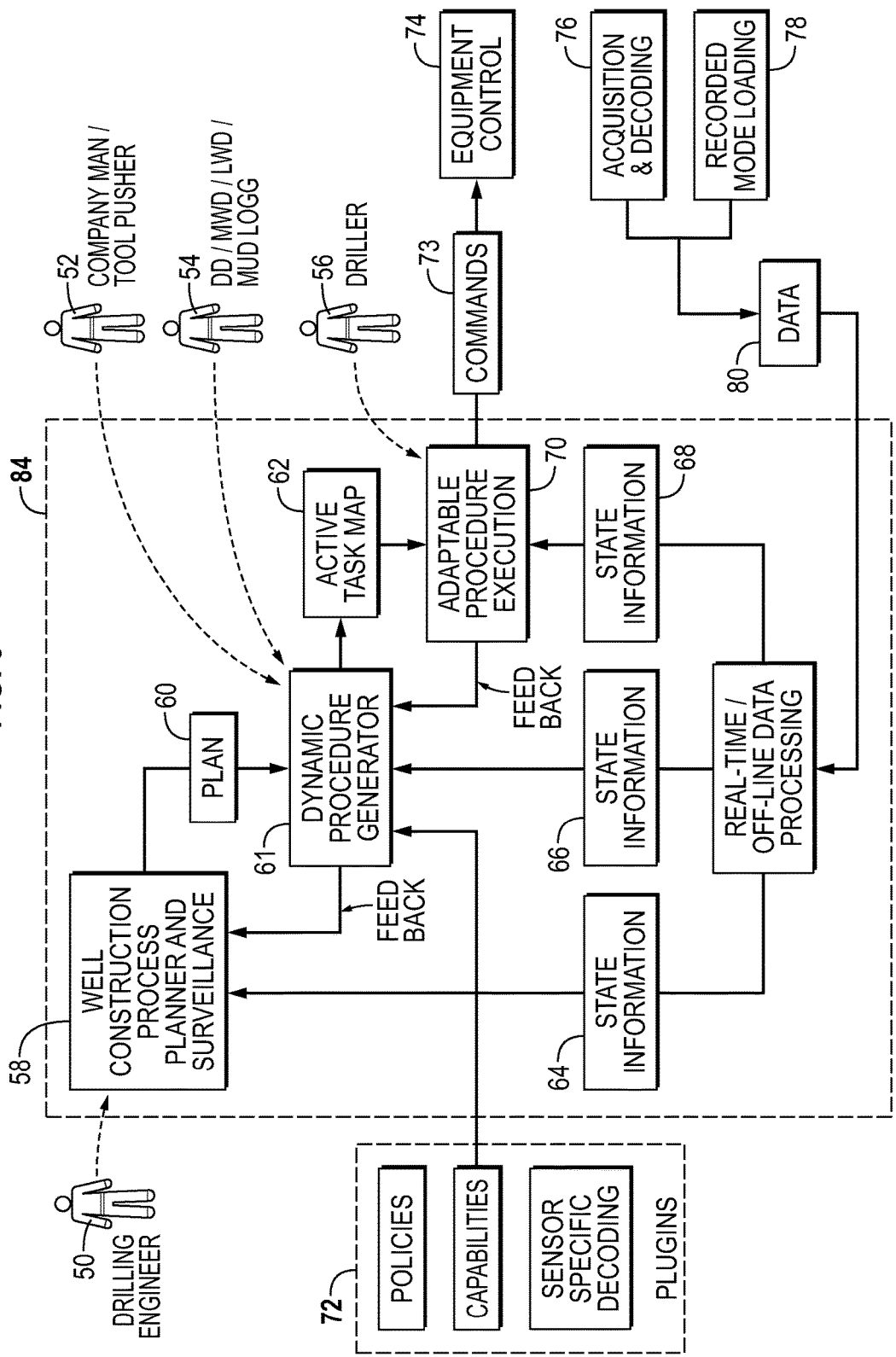
FIG. 3 shows an example process implemented on an individual well being planned and drilled.

Description of a method and system according to the present disclosure will be explained using an example system for generating a set of actions to be taken by various personnel and/or automatically by computer controlled equipment. The set of actions may be generated prior to beginning construction operations on one or more wells, and as will be explained below with reference to FIGS. 1 through 3, such set of actions may be modified during construction of one or more wells to take account of completion of selected ones of the actions and/or modification of the unexecuted actions to account for deviation of the well state (defined below) from a planned well state (defined below) at any point in time. The process for generating a set of actions or "task list" explained with reference to FIGS. 1 through 3 is only provided as an example of a method and system used to generate a task list for a particular well and should not be construed as limiting the scope of the present disclosure.

Figure 1:
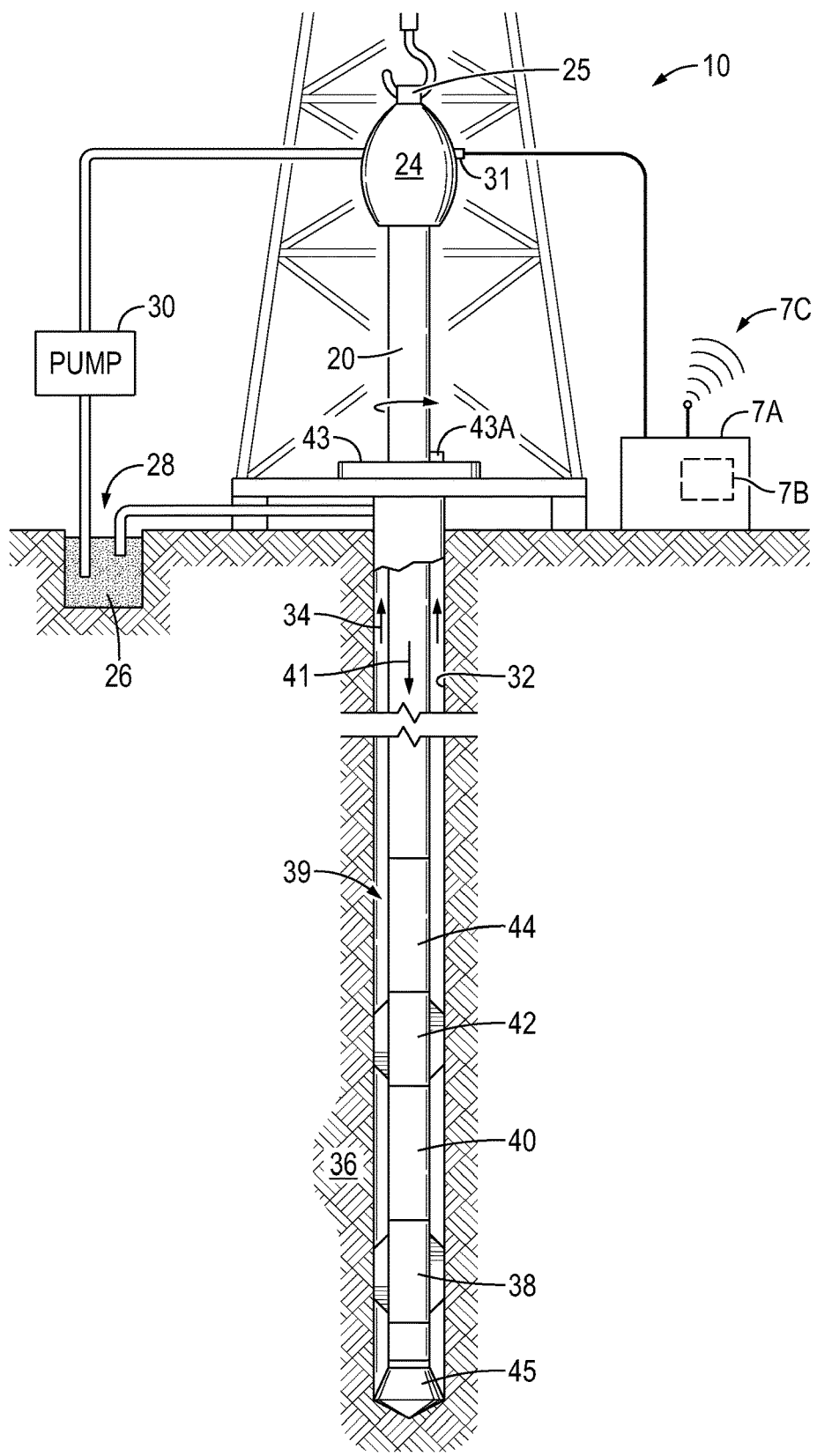
FIG. 1 shows an example well site drilling system as it is used to drill a wellbore through subsurface formations.

FIG. 1 shows an example drilling system configuration for drilling and completing a wellbore and for acquiring well data that may use, among other sensing devices, a logging while drilling (LWD) system 39. The LWD system 39 may include one or more collar sections 44, 42, 40, 38 coupled to the lower end of a drill pipe 20. The LWD system 39 may form part of a bottom hole assembly (BHA) coupled to the drill pipe 20 and includes at a lower end thereof a drill bit 45 to drill a wellbore 32 through the earth's subsurface 36. Drilling may be performed by rotating the drill pipe 20 by means of a rotary table 43, or in other examples by a top drive (not shown in FIG. 1). In still other implementations a drilling motor (not shown) such as an hydraulic motor may be used to rotate some or all of the drill pipe 20. The manner of rotating the drill pipe 20 is not a limit on the scope of the present disclosure. During rotation, the drill pipe 20 is suspended by equipment on a drilling unit (drilling rig) 10 including a swivel 24 which enables the pipe 20 to rotate while maintaining a fluid tight seal between the interior and exterior of the pipe 20. Mud pumps 30 draw drilling fluid ("mud") 26 from a tank or pit 28 and pump the mud 26 through the interior of the pipe 20, down through the LWD system 39, as indicated by arrow 41. The mud 26 passes through orifices (not shown) in the bit 45 to lubricate and cool the bit 45, and to lift drill cuttings in through an annulus 34 between the pipe 20, LWD system 39 and the wellbore 32. The cuttings may be collected and analyzed by separate equipment operated by a "mud logger." Any fluid content in the returned drilling mud, such as gas and/or oil may also be analyzed by the mud logger's equipment or other devices, such as an automatic gas chromatograph. The mud logger, as will be explained below with reference to FIG. 3, may provide information related to analysis of cuttings and the returned mud 26 by manual or automatic entry into a computer system (FIG. 2) that analyzes data input thereto.

The collar sections 44, 42, 40, 38 may include sensors (not shown) therein which make measurements of various properties of the subsurface earth formations 36 through which the wellbore 32 is drilled. These measurements are typically recorded in a recording device (not shown) disposed in one or more of the collar sections 44, 42, 40, 38. LWD systems known in the art typically include one or more "measurement while drilling" (MWD) sensors (not shown separately) which measure selected drilling parameters, such as inclination and azimuthal trajectory of the wellbore 32. Other drilling sensors known in the art may include axial force (weight) applied to the LWD system 39, and shock and vibration sensors.

The LWD system 39 may include a mud pressure modulator (not shown separately) in one of the collar sections 44. The mud pressure modulator (not shown) applies a telemetry signal to the flow of mud 26 inside the LWD system 39 and drill pipe 20 where it may be detected by a pressure sensor 31 disposed in the mud flow system. The pressure sensor 31 may be coupled to detection equipment (not shown separately) in signal communication with a surface recording system 7A. The surface recording system 7A may enable recovery and recording of information transmitted in the signal telemetry generated by the LWD system 39. The telemetry signal may include a subset of measurements made by the various sensors (not shown separately) in the LWD system 39. The remainder of the measurements made by the sensors (not shown) in the system may be transferred, for example, using radio telemetry or a cable connection, to the surface recording system 7A when the LWD system 39 is withdrawn from the wellbore 32.

The LWD data acquisition system and method shown in FIG. 1 is only meant to serve as an example of how data are acquired at the well site, and is not in any way intended to limit the scope of the disclosure. Other sources of data may include control systems for wellbore pressure control. See, for example, U.S. Pat. No. 6,904,981 issued to van Riet. The system described in the van Riet '981 patent can provide automatic control over wellbore fluid pressure, and may also calculate parameters such as expected formation fluid pressure and expected formation fracture pressure. Such data may also be communicated as will be further explained below. Still other sources of data may include, without limitation, so-called "mudlogging" data as explained above, wherein drilling fluid returned from the wellbore is analyzed for the presence of materials such as hydrocarbons, and samples of drill cuttings are analyzed for mineral content and grain structure. Still other data may include casing programs (i.e., depth to which casings are set and respective diameters thereof and types of cement to be used) and planned wellbore geodetic trajectory. Any one or more of the foregoing data types, whether measured during drilling of the wellbore, entered into a computer system (explained below) manually or otherwise, may be referred to as a "wellbore construction parameter." The drilling rig operator (driller) may operate the drilling unit, typically by manual input to a control panel of a programmable logic controller (PLC—not shown in FIG. 1) that operates various devices on the drilling rig such as the rate at which the pump 30 discharges drilling fluid, the rate at which the swivel 24 (or top drive) is lowered into the wellbore 32, thus affecting the axial force (weight) on the drill bit 45, which may be inferred by a load cell 25 that measures the axial loading on the drill pipe 20, and the rotating speed of the drill bit 45. The foregoing parameters, which are controllable by the drilling unit operator, may be referred to as "drilling operating parameters." Another sensor that may be used in some examples is a torque sensor 43A that may be coupled to the rotary table 43 if used, or may be included in the top drive (if used; not shown in FIG. 1).

In FIG. 1 both the surface recording systems 7, and 7A, respectively, may include a data communication subsystem 7B coupled to a suitable antenna, satellite dish or other communication link 7C. Such data communication subsystem 7B may be of any type known in the art suitable for use at the particular location of the welllsite, for example, satellite communication to the Internet, or a dedicated satellite based communication link. Radio communication, wired communication or any other form of data communication is within the scope of the communication subsystem 7B applicable to the present example method and system and the foregoing examples should not be considered as limiting the scope of the present disclosure. Communication may also take place over any form of data communication network.

For purposes of the present disclosure, the drilling system shown in FIG. 1 may be only one of a plurality of such drilling systems that may be monitored by a well construction engineer or drilling engineer (FIG. 3) from any geographic location and using any device that can access a computer system as will be explained with reference to FIG. 2. Such access devices may be directly connected to the computer system, or may be remotely accessible, such as by wireless broadband systems using Internet-capable communication (e.g., tablets or smart phones), dedicated-channel wireless or radio communication terminals, or telephone network connected terminals (e.g., DSL Internet access). Monitoring and advising operations on a plurality of well construction projects will be further explained below.

FIG. 2 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks to be explained further below. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents). The processor(s) 104 may be in signal communication with a display/input device 107, which may be, for example, and without limitation, a touch screen, LCD or LED display and keyboard or any other form of device for displaying information transferred through or generated in the processor 104 to one or more human operators. Each of the additional computer systems 101B, 101C, 101D may have associated therewith a display and user input device 101BB, 101CC, 101D, respectively, as explained with reference to computer system 101A.

A processor for purposes of the present disclosure can include a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 2 the storage media 106 are depicted as being disposed within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media may be located either in the machine running the machine-readable instructions, or located at a remote site from which machine-readable instructions can be downloaded over a network for execution.

It should be appreciated that the computing system 100 is only one example of a computing system, and that the computing system 100 may have more or fewer components than shown, may combine additional components not depicted in the example embodiment of FIG. 2, and/or the computing system 100 may have a different configuration or arrangement of the components depicted in FIG. 2. The various components shown in FIG. 2 may be implemented in hardware, software, or a combination of both hardware and software, including one or more signal processing and/or application specific integrated circuits.

Further, the elements in the processing methods described below may be implemented by running one or more functional modules in information processing apparatus such as general purpose processors or application specific chips, such as ASICs, FPGAs, PLCs, or other appropriate devices. These modules, combinations of these modules, and/or their combination with general hardware are all included within the scope of the present disclosure.

FIG. 3 shows an example implementation of a well construction decision support and control system that may be used to generate output in the form of dynamically adjustable lists of tasks for various personnel, explained below, to perform during the well construction procedure. Part of the system shown in FIG. 3 may be implemented in the recording system (7A in FIG. 1) and/or in any other computer or computer system as explained with reference to FIG. 2. Data from wellbore drilling, including the selected drilling operating parameters defined above and "drilling response parameters" (e.g., and without limitation) rate of axial elongation of the wellbore, torque applied to the drill pipe (20 in FIG. 1) and pressure of the drilling fluid (26 in FIG. 1) both as it is pumped in and as it is returned to the surface, well tortuosity, detected wellbore fluid influx or loss, drill bit wear rate and drilling motor performance, may be acquired as measured (acquisition and loading) as shown at 76 and/or recorded in the various components of the MWD/LWD instrument string (FIG. 1) shown as "recorded mode loading" at 78. Such data may be transferred to the computer, computer system or data processor (e.g., 101A in FIG. 2) for calculating parameters relevant to construction (e.g., drilling) of the wellbore. The data may also be stored in any form of data storage device at 80. Such calculated parameters may include, without limitation, wellbore geodetic trajectory, formation physical characteristics such a fractional volume of pore space (porosity), fluid content and mineral composition thereof, fluid pressures, rate of penetration of the drill bit (i.e., rate of axial elongation of the wellbore), and characteristics of mechanical interaction between drilling and measurement equipment in the wellbore and the wellbore (FIG. 1) through the formations as the wellbore is drilled. The measurements used to generate the foregoing calculated parameters, as well as the measurements themselves, may be communicated to the computer system as shown in FIG. 2 as well as a computer or processor located at the well site, e.g., as shown at 84 in FIG. 3. Collectively, the measurements and any such computed parameters may be referred to as the "state" of the wellbore ("well state") at any point in time. The well state may be communicated (e.g., using the communication system 7B, 7C in FIG. 1) at 64, to the well construction supervisor, well construction engineer or drilling engineer 50. The foregoing personnel may be located at a geographic location different than any of the one or more wells being constructed and in communication with a system according to the present disclosure.

The well construction engineer 50 may access the computer system ("surveillance" in FIG. 3) by any means as explained above to evaluate the well state at any time, as shown at 58 in FIG. 3. The well state may also be communicated to a wellbore owner ("operator") representative 52 and the drilling unit operator ("driller") 56 in a suitable format to enable the respective personnel to take specific action. Communication of the well state may include generating a display on a graphic user interface on signal communication with the computer system. Such action may be taken by manually operating certain controls of the drilling unit and any ancillary equipment, entering commands or other input to any form of computer system human user interface or to allow automatic operation of the drilling unit and any ancillary equipment configured for such automatic operation in response to the calculated well state.

Initially, a wellbore under construction such as shown in FIG. 1 may have, for example and without limitation, a pre-planned trajectory, predefined set of pipes or casings and depths to which they are to be set, drill bits to be used, and densities of drilling fluid to be used in the wellbore construction, called the "well plan" 60 in FIG. 3. The computer system (FIG. 2) may generate a set of tasks, at 61 ("dynamic task generator"), to be performed in a generated chronological order (noting that some tasks may be wholly or partly contemporaneous) to cause the well to be constructed according to the well plan 60. The set of tasks may include, for example and without limitation drilling operating parameters to be used at any point (e.g., axial extent or measured depth) along the well being drilled. In addition, the particular wellbore operator may have its own particular set of policies and procedures, shown at 72, which limit the scope of actions or tasks that may be used in the execution of the well plan 60, and as will be further explained, may provide limits and/or guidance on response to incidents during drilling that exceed the scope of expected conditions or the operator-determined policies and procedures. The range of possible tasks may also be limited by the physical limitations of the drilling equipment (also shown at 72). The well plan 60 may be communicated to a computer terminal or display or be otherwise remotely accessible by a wellbore operator representative ("company man") shown at 52 and/or a drilling contractor supervisor ("tool pusher") shown at 52 located at the well site. Such access may be in any form as described with reference to the computer system in FIG. 2.

As a result of the well plan 60 and computed procedures (i.e., the task list) generated by the dynamic task generator 61, it is possible to calculate a set of well states corresponding to each depth in the wellbore that may be expected to exist during its construction. Such expected well states may be referred to individually, e.g., by wellbore axial length or "depth", as a "predetermined well state." During drilling of the wellbore, the calculated well state and/or the computed procedures, as explained above and shown at 62 and 64, may be communicated to the company man and/or toolpusher 52 as drilling of the wellbore proceeds. The foregoing individuals may reject, approve, replace or modify any task changes calculated by the computer system with such action recorded in the computer system (or other data storage, e.g., at 80 in FIG. 3) and may be communicated to other parts of the computer system and corresponding personnel. In similar way, a potentially different description of well state and/or tasks may be communicated to selected individuals responsible for performing tasks related to any part or all of the well construction plan, e.g., the drilling engineer 50.

In some circumstances the calculated well state may differ from the predetermined well state such that the computer system 84 may calculate that completion of construction of the wellbore according to the initial well plan is impracticable or cannot be performed without exceeding the scope of the policies set by the wellbore operator or the physical limitations of the drilling equipment (e.g., at 72) or is likely to incur a risk of an adverse condition such as stuck pipe, wellbore collision, circulation loss, etc. that exceeds a selected risk threshold. Such circumstances may cause an update to the well plan 60, generated automatically by the computer system 84 and approved, updated, rejected or replaced by a person with requisite authority such as the well construction engineer 50, and such update(s) may be communicated to other parts of the system and corresponding personnel in a manner as described above. The authority of various personnel to change, accept, reject or modify any task in the well plan may be preprogrammed into the computer system. In the present example, changes in the well plan 60 necessitated by differences between the planned well state 64 and the actual well state, e.g., as computed at 66 may cause the computer system 84 to calculate one or more possible procedures (i.e., in the dynamic procedure generator 61) and tasks associated with such procedures, shown at 62 as an "active task map" to be displayed to the personnel responsible for execution of the specific procedures or subsets of the specific procedures.

Specific drilling tasks or drilling operating parameters to be used during drilling of the wellbore at any time may be communicated to the drilling unit operator ("driller") 56, shown as "adaptable procedure execution" at 70 in FIG. 3, using the computer system at 84, or as explained with reference to FIG. 2. The driller 56 may access the computer system 84 in any manner as explained with reference to FIG. 2. The driller 56 may then use the communicated drilling operating parameters to operate the drilling system (FIG. 1) in a manner consistent with the procedures communicated in the execution block 70 in FIG. 3. Such operation may include manual, automatic or other entry of control signals 73 to a programmable logic controller (PLC) 74 that may operate the drilling unit automatically in accordance with the entered parameters, such as at 74 in FIG. 3. The drilling unit (FIG. 1) may also be operated manually if automatic controls are not provided at any particular drilling unit.

As the wellbore is being drilled, the well state, computed as explained above, may be communicated to the driller 56. In the event the computed well state at any time differs from the expected or predetermined well state at any point in the initially generated well plan, the dynamic task generator 61 may calculate corrective procedures, e.g., changes to one or more drilling operating parameters and/or tasks needed to complete drilling of the wellbore and communicate such tasks to the tool pusher, company man 52 and/or driller 56. The corrective procedures may be communicated as shown at 62 in FIG. 3. As shown in FIG. 3, the corrective tasks may be limited or governed by policies or best practices of the particular wellbore operating entity, which may be entered into the computer system upon generation of the initial well plan (e.g., at 72 in FIG. 3) or at any other time. Thus, the types of corrective tasks generated in the dynamic procedure generator 61 may be consistent with such predetermined policies. When communicated to the driller 56, the corrective actions may be implemented in the same manner as ordinary drilling controls or operational procedures, i.e., by manually, automatically or otherwise entering commands, at 73, into the PLC to operate the various components of the drilling unit, at 74. The computer system (FIG. 2) may record all operations and all user actions and may report compliance of such operations with the predetermined policies. Revised calculations of the well state 68 may be used to determine, at 70 whether the adjusted procedures, at 62 have fulfilled the purpose of correcting the actual well state to more closely correspond to the predetermined well state at any point in the well, or if further correction to the procedures (e.g., by dynamic task generator 61) is needed. As explained above, if the calculated well state is such that the dynamic task generator 61 cannot generate a corrective procedure to enable the well state to be returned to the predetermined well state at any depth, such information may be communicated to the well construction engineer 50 and a revised well plan 58 may be generated either automatically and/or manually input to the computer system (FIG. 2) by the well construction engineer 50. The revised well plan 58 may be used to generate new values for drilling operating parameters (in the dynamic task generator 61) and/or drilling tasks. The revised well plan 60 will result in an expected or predetermined well state for the remaining portion of the well to be constructed. The foregoing comparison of the actual well state to the predetermined well state may continue in the same manner for a revised well plan as described with reference to the initial well plan.

As the wellbore is being drilled, data may also be communicated to various service company personnel at the well site and/or at remote locations using the computer system (FIG. 2). Such personnel may include, without limitation a directional driller (person who operates directional drilling instruments to cause the wellbore to follow a preplanned geodetic trajectory), mud loggers, and MWD/LWD operating personnel, shown collectively at 54. Such data may include raw measurements from various sensors on the drilling unit or disposed in the drill string (FIG. 1), a computed state of the well at 68, an active task list at 62 (which may be a set of drilling and/or ancillary tasks or procedures to be performed as explained above), and drilling operating parameters at 73. The communicated data may indicate that a change in one or more tasks or drilling operating parameters is necessary. Possible changes in the drilling operating parameters may be calculated in the computer system FIG. 2) and communicated to the company man, tool pusher and/or service company personnel as explained above with reference to the dynamic procedure generator. The foregoing personnel may make decisions based on the calculated changes to the drilling operating parameters or active task lists; these decisions may be recorded in the computer system and communicated to the driller 56. The driller 56 may then change one or more of the drilling operating parameters either as calculated or as modified by any or all of the foregoing personnel described above to cause the well state to conform to the predetermined well state 60. Alternately, the computer system may be configured to automatically change one or more of the drilling operating parameters with or without driller involvement. As explained above, the corrective procedures may be constrained by the particular wellbore operator (oil company that is in charge of the wellbore construction) policies entered into the computer system at 72, or by the drilling equipment capabilities.

During drilling the wellbore, the well state and the active task list 62 may also be communicated directly to the driller 56. The driller 56 may adjust one or more the drilling operating parameters, as previously explained using adaptable procedure execution at 70, at any time to cause the wellbore to be drilled more closely to the predetermined well plan, or to cause the well state to more closely match a predetermined well state, to the extent the well state deviates from the predetermined well state or well states that are within selected operating limits. Non-limiting examples of well states that may be limited include an amount of "overpull" when the drill string is lifted from the bottom of the well, and amount of torque applied to the drill string, the well trajectory differing from a planned trajectory by a selected threshold amount and a pressure of the drilling fluid being pumped into the drill string.

In the present example, the drilling unit (10 in FIG. 1) may include automatic controls for implementing certain aspects of the drilling operations. For example, the rate of movement of the drill pipe into the wellbore, the rate of pumping and the rotation rate of the drill pipe from the surface may all be automatically controlled. The computer system (FIG. 2) may generate command signals according to the adaptable procedure execution block 70. The commands may be entered into the equipment control 74, as explained above, such as a programmable logic controller (PLC) that causes the drilling unit to operate according to the selected or calculated drilling operating parameters.

While all of the foregoing activity is underway, the well construction (drilling) engineer 50, as explained above, may have remote access to the data used to calculate the well state, the active task list, the drilling operating parameters, the risks of adverse conditions and the calculated well state at any time. To the extent the actual well state deviates from any predetermined well state, the well construction engineer 50 may communicate instructions to the company man, the tool pusher, the driller (collectively 52) or any of the service company personnel (collectively at 54) at the well site to change procedures and/or one or more drilling operating parameters to correct any deviations of the well state from the predetermined well state. The computer system may also automatically calculate adjustments to one or more drilling operating parameters to cause the calculated well state to more closely match a predetermined well state.

Automatic calculation of correction to one or more drilling operating parameters may be made using, for example and without limitation, stored data from other nearby wellbores (e.g., in data storage 80), empirically derived relationships between drilling operating parameters (which may also be stored, for example, in data storage 80) and drilling response parameters, and measurements of parameters used to calculate the well state.

Figure 4:
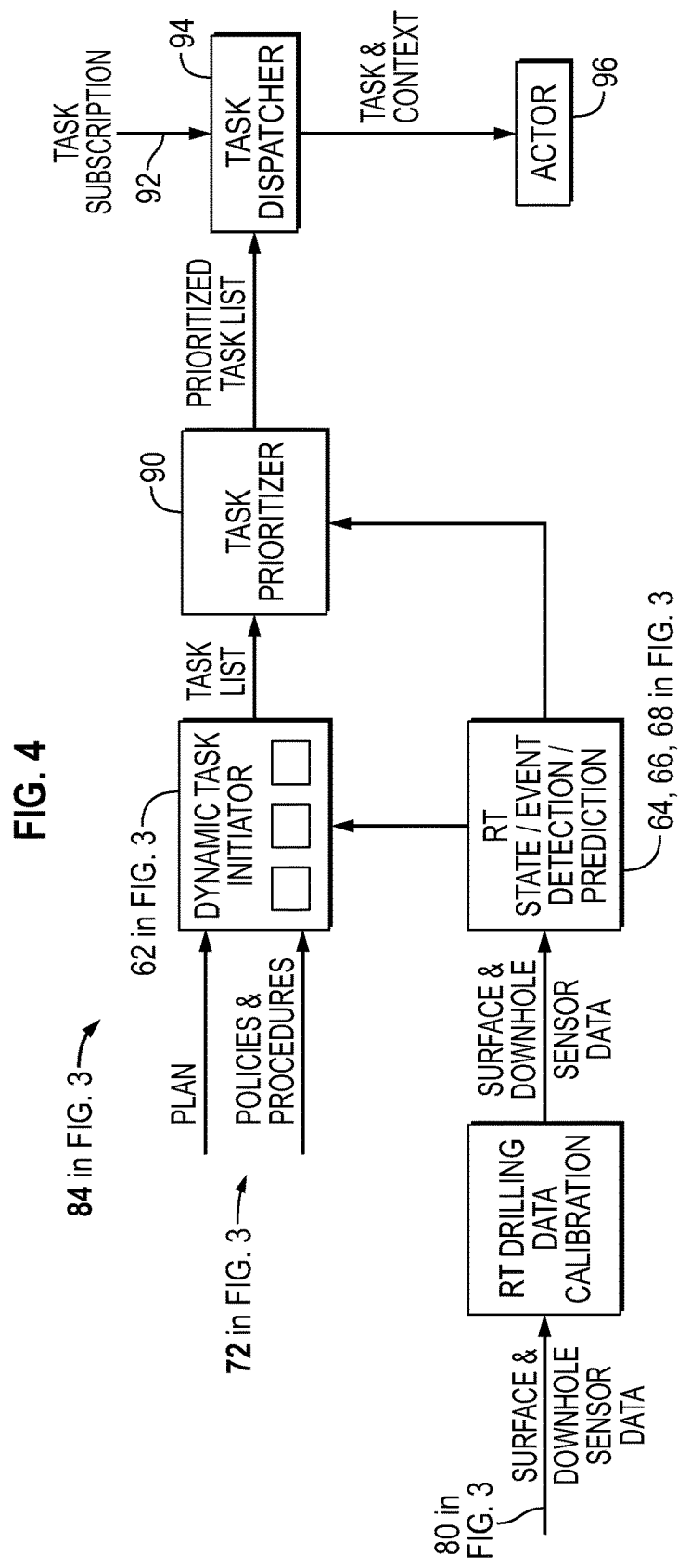
FIG. 4 shows an example task or action prioritizer and allocator according to the present disclosure used on a single well.

The foregoing example may be used with a prioritizing system and method according to the present disclosure. Referring to FIG. 4, the active task list (62 in FIG. 3) may be generated as explained above. The active task list may be constrained by policies and procedures implemented by the well owner and the capabilities of the equipment (e.g., 72 in FIG. 3). In the present example, the task list may be generated by a dynamic task initiator that manages a dynamic set of task triggers. A task trigger specifies the trigger for the task to be recognized during well operation activities, and the action to be triggered. A trigger could be simple as an instruction to "Deliver Data" that is triggered when a survey is made by the MWD system (FIG. 1) at each directional survey point along the well trajectory. Another example of a trigger may be more complex such as to reduce the wellbore fluid pressure by a selected amount or selected fraction when the equivalent circulating density (ECD) approaches the fracture gradient of the formations (36 in FIG. 1). The task triggers may be programmed into the computer software or they may be specified and input to the computer system by a system user with requisite authority (e.g., the drilling engineer) when the computer system (FIG. 2) is initialized. The dynamic task initiator may accept as input one or more of: (i) data substantially in real time from surface and downhole sensors such as those explained with reference to FIG. 1; (ii) state/event detection/prediction; (iii) well plan information, and (iv) policies and procedures. An output of the dynamic task initiator may be functionally equivalent to the output of the dynamic task generator (61 in FIG. 3), and may be used as input to a prioritizing and dispatching system as will be explained below with reference to FIGS. 4 and 5. Tasks initiated by the dynamic task initiator may include tasks to advance the well construction process, tasks to alleviate/avoid an excessive risk condition, tasks to enhance the efficiency of the well construction process, and/or tasks to comply with policies.

The dynamic task list generated by the dynamic task initiator may be conducted to a prioritizer 90. The prioritizer 90 may be implemented as executable code in any one or more parts of the computer system (FIG. 2). An output of the prioritizer 90 in one example may be a chronological order in which the tasks generated by the dynamic task initiator are to be performed. Note that, as previously explained, some of the tasks may be partially or wholly contemporaneous. Another possible output of the prioritizer is a time window (an amount of time from the current time and a length of time therefrom) in which each of the input tasks must be performed.

The prioritizer 90 may generate chronological order and/or time windows for each input task based on user selected criteria input by a user with requisite authority. The user responsible for managing priorities in the system may or may not be the same user that performs other functions within the system. Examples of such user selected criteria may include, without limitation, difference between determined wellbore spatial position at a selected depth and planned spatial position (thereby generating a directional drilling task to steer the well to reduce difference between the determined position and the planned position). Other possible criteria may include whether measured shock and vibration in the drilling tool assembly (e.g., the LWD and MWD systems in FIG. 1) exceed selected thresholds and by what extent the thresholds are exceeded, whether the ECD is approaching the fracture gradient or the pore pressure of the formations (36 in FIG. 1), an elapsed time since a task trigger was generated without the task being performed, whether data that have been acquired (e.g., directional survey data) have been entered into the well database or otherwise transmitted to the appropriate facility or person. Still other examples of prioritizer criteria may include measurement of parameters that indicate increased risk of the drill string becoming stuck in the wellbore (thus increasing priority of a washing/reaming/circulating task priority). Such parameters may include overpull exceeding a selected threshold and by how much and starting torque (torque required to start rotation of the drilling tool assembly or drill string) exceeding a selected threshold and by how much. Still further examples of prioritizer criteria may include ECD approaching the pore pressure of the formations wherein measurements of fluid flow into the well and fluid flow out of the well are indicative of fluid entry into the well, or conversely, if the ECD is determined to be approaching the fracture gradient of the formations, measurements of fluid flow in/flow out indicative of drilling fluid being lost into the formations.

Thus, the task list may have a chronological order and time of performance window for each task that as generated by the dynamic task initiator that may be reordered and/or reset by the prioritizer based on criteria such as the foregoing. As an example general principle, the prioritizer may be programmed to move one or more particular tasks forward in chronological order and/or decrease their respective time of performance window (i.e., indicate that the task must be performed within a shorter time) in order to optimize a selected well construction performance parameter. A well construction performance parameter may be any parameter that is related to how efficiently construction is performed, wherein the efficiency may be defined by any selected criterion.

One example well construction performance parameter may be the risk adjusted cost of an adverse drilling event taking place if the task is not performed in the adjusted chronological order and within the adjusted time window. As non-limiting examples of the foregoing, a required correction to the wellbore trajectory (directional drilling operation) may be originally scheduled ahead of a change in ECD (such as by changing mud density and/or flow rate). However, an indication that the ECD is approaching the fracture gradient of the formations may require that changing the ECD is moved ahead of the directional drilling operation chronologically and must be performed within a shorter time window. Correspondingly, a casing setting operation may have been chronologically behind the directional drilling operation and ECD adjustment, however an indication that the ECD cannot be reduced to avoid fracturing the formation because there would be a risk of the ECD falling below the formation pore pressure may result in the prioritizer moving the casing setting operation forward in time to the first task in the dynamic task list, and require that the casing setting be performed immediately. Those skilled in the art will readily devise numerous other possible combinations of task prioritizer selection criteria and the foregoing should only be considered as non-limiting examples.

Other example well construction performance parameters may include, without limitation, minimum cost to complete well construction at any point in time, minimum risk to complete construction without a well pressure control event (fluid loss and/or fluid influx into the well, particularly in environmentally sensitive areas), minimum time to complete construction of a well, maximized length of a well segment remaining within a target reservoir formation so that production from the well may be maximized or minimized drilling time adjusted for risk of collision with other wells when a well is directionally drilled, e.g., from a same pilot well as may be used for other wells each having a different preplanned trajectory.

Once the tasks are prioritized, the prioritized task list may be allocated by a task dispatcher 94. The task dispatcher 94 may also form part of the software code programmed into any one or more parts of the computer system (FIG. 2). The task dispatcher 94 takes the prioritized task list and then communicates particular ones of the tasks to various actors 96 based on a subscription registration 92. The subscription registration 92 may be based on factors such as well or rig identification, well type, well location, task type, task status, task priority, task trigger severity, time since trigger or combinations thereof. When a task is communicated to an actor 96 it may be communicated with the task context including but not limited to action to be undertaken, task status and task priority. Subsequent tasks assignable to the same actor 96 may be communicated with the chronological order in which they are to be performed and the time window in which each task must be performed. As a general principle the task dispatcher 94 communicates selected ones of the tasks in the task list generated by the task prioritizer 90 to the actor 96 or actors who is/are responsible for carrying out the selected ones of the tasks. The subscription registration 92 may be initialized at the time well construction operations begin, and may be dynamically adjusted depending on changes in personnel, changes in effectiveness of particular classes of personnel in carrying out certain types of tasks, amount of tasks allocated to a particular actor or other criteria that may be selected by the system operator. For human actors, the task dispatcher 94 may transmit the tasks in chronological order individually, e.g., only the highest priority task for each particular human actor and may guide the actor 96 through performance of such task and then transmit subsequent chronologically ordered tasks upon completion of each task. For example, if the most important task for an MWD engineer is to investigate a survey quality control problem indicator (flag), then the computer system may display to the MWD engineer a correspondingly designed "Survey QC" display screen. However, if the most important task was to deliver MWD data for a selected length of well that has been drilled, then the computer system could display a Client Log Delivery screen to the MWD engineer. A human user interface may also allow the user to input an override request for the prioritized tasks to identify and address a lower priority task. The computer system may be programmed to route such requests to a supervisory user, such as a drilling engineer, who may review the override request and approve or reject the request based on view of a broader set of tasks than may be communicated to selected individuals by the task dispatcher 94. Such broader set may include the entire set of prioritized tasks, depending on the level of authority granted to the particular user by the well operator.

For computer system (machine) actors, the software may cause an associated apparatus element of the drilling unit and/or ancillary equipment to execute the task for the given context in priority order. For example, if the highest priority task is to orient the toolface of a steerable motor (to effect a trajectory correction) rather than to adjust rate of penetration (ROP), the system would cause the drilling unit to orient the toolface and then adjust the ROP once the selected toolface is attained.

Figure 5:
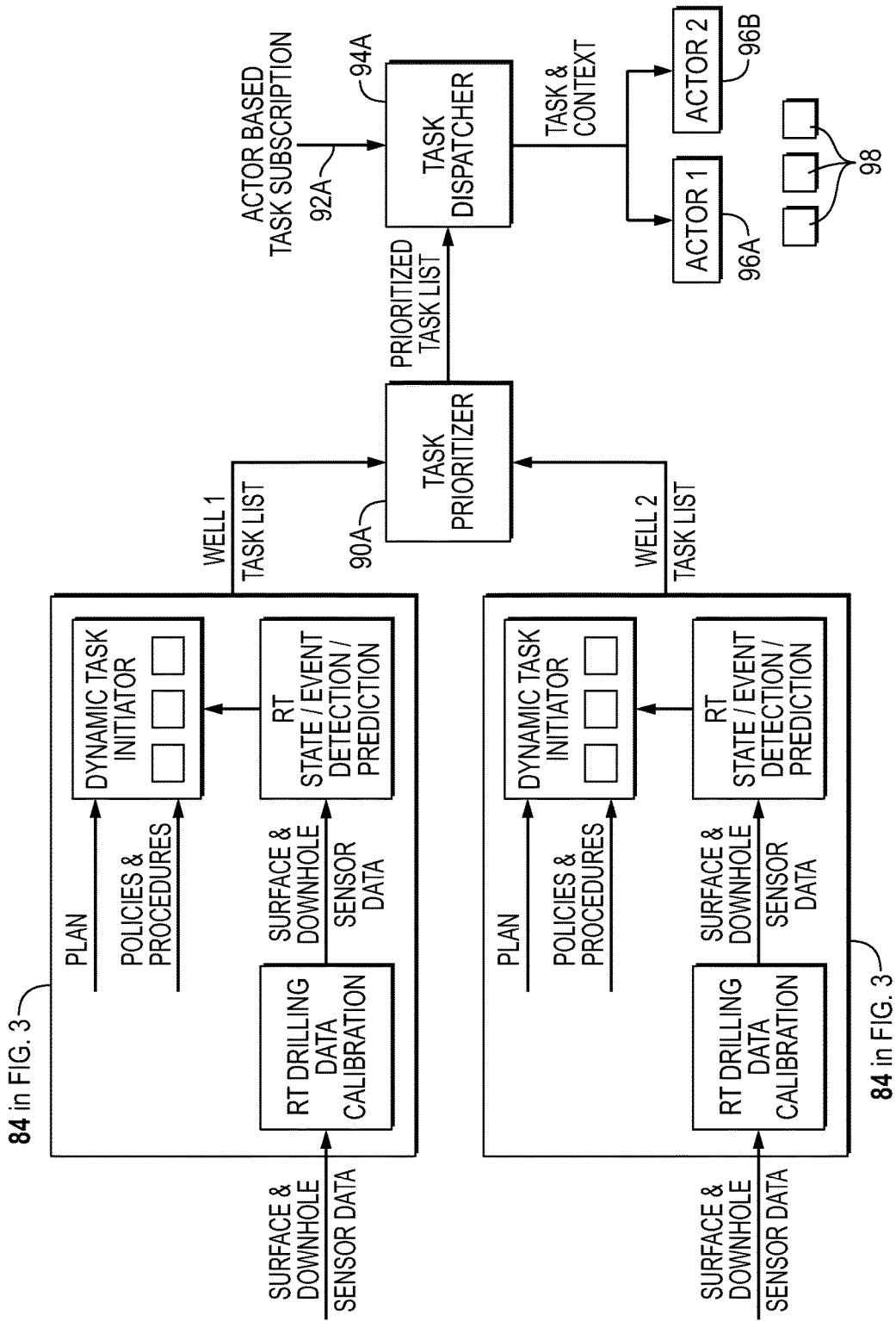
FIG. 5 shows an example task or action prioritizer and allocator according to the present disclosure used on a plurality of contemporaneously operated wells.

FIG. 5 shows an example of using a system such as shown in FIG. 4 for a plurality of wells. FIG. 5 shows a dynamic task generator for each of two wells, however, it should be clearly understood that the same principle may apply irrespective of the number of wells in a system according to the present aspect of the disclosure. In the present example, the task list generated by each dynamic task generator may be conducted as input to a multi-well prioritizer 90A. The multi-well prioritizer 90A may be programmed to reset the chronological order and/or change the time of performance window length of tasks input from each dynamic task generator. In the present example, the multi-well prioritizer 90A may also calculate a chronological order as to which of the wellbores should have their actions taken in a particular chronological order and/or within a selected time window. This well priority may apply to all tasks for the well, or only within a class of tasks. For example, given a set of tasks of priority 1, 2 and 3 for Well A and Well B, the multi-well prioritizer 90A may be configured or programmed to prioritize all tasks for Well A over Well B or just Well A over Well B within a particular priority level. (Well A Priority 1 then Well A Priority 2 then Well A Priority 3 then Well B Priority 1 then Well B Priority 2 then Well B Priority 3 versus Well A Priority 1 then Well B priority 1 then Well A Priority 2 then Well B Priority 2 then Well A priority 3 then Well B priority 3.) Thus, a multi-well prioritized task list may include acting on different wells in a particular chronological order. Criteria by which the multi-well prioritizer 90A may be programmed to calculate a multi-well prioritized task list may be the same as described above with reference to the single well prioritizer. The multi-well prioritizer 90A may be programmed to accept as input selected characteristics of the wells being managed using the present example system to enable refined determination of the multiple well task prioritization to the extent such may be enabled by common characteristics between wells. Examples of common characteristics may include, without limitation, geographic proximity, one or more target formations, planned trajectories of each of the wells, among others. In other examples, the wells may be in disparate geographic locations and have substantially no common characteristics. In such cases, the multi-well prioritizer 90A may be programmed only to set the chronological order and/or time window for tasks for the plurality of wells to optimize at least one well construction performance parameter on each of the plurality of wells. The multi-well prioritizer 90A may also prioritize the tasks according to well characteristics. Those well characteristics could include those listed above as well as well as contract type, risk profile, well operator, etc.

The example shown in FIG. 5 may also include a task dispatcher 94A that allocates tasks and time of performance windows generated by the prioritizer 90A to a plurality of actors 96A, 96B. The function of the task dispatcher 94A in FIG. 5 may use actor-based subscription 92A to allocate tasks in a manner similar to the single well task dispatcher shown in FIG. 4. It should be understood that multiple actors 96A, 96B shown in FIG. 5 receiving instructions from the task dispatcher 94A in FIG. 5 may be present and receive task instructions in a single well version of the task dispatcher as shown in FIG. 4. The number of and type of actors receiving instructions from the task dispatcher is not a limit on the scope of the present disclosure but is a matter of discretion for the system designer or the system user. When the system is configured or programmed to enable the system user to select the number and type of actors, a user having requisite authority by the well(s) owner, e.g., a drilling engineer or drilling manager may be enabled to reprogram the task dispatcher 92A to best serve the requirements of the one or more wells being managed by the system.

The system may also have programmed performance monitoring for each of the actors 96A, 96B receiving instructions from the task dispatcher 94A. For example, as explained with reference to FIG. 3, the extent and conformance to specification of each action taken by the respective actors may be used to calculate an actual well state. The actual well state may be compared to the predetermined well state. Actors who are determined to provide task performance that causes the actual well state to deviate from the predetermined well state, or which do not perform the allocated tasks correctly and within the prioritized time window sufficiently consistently may be: (i) replaced if the actor is a person or; (ii) reprogrammed or replaced if the actor is a machine or apparatus. Other options may include reallocating the number of actors if it is determined that the number of particular types of tasks generated by the task dispatcher is excessive for the number of actors assigned to the particular type of task. Such reallocation of the number of actors may be initiated by generation of a warning signal on a display of a supervisory level user (e.g., a drilling engineer or drilling manager) who may then order the reallocation of actors and reprogram the task subscription 92A corresponding to the reallocation. Reallocation may take place for example and without limitation, by direct personal communication or by transmission of instructions to the affected user's equipment display.

Reallocation of actors may be dynamic, that is, reallocation may continually be performed during the construction of multiple wells as the need for certain numbers of actors of various types (as non-limiting examples, directional drillers, MWD engineers, reservoir characterization engineers, drilling fluid engineers, geologists, geophysicists and drillers) at any point in time changes with respect to the multi-well prioritized task list generated by the prioritizer 94A.

In some embodiments, the computer system may communicate to operator personnel and/or service company personnel not actively engaged at the time with the well construction operation on any one or more wells. Such communication may take the form of a text message (SMS or other type), automatically generated telephone call or other communication to a mobile communication device in the possession of such personnel. The communication may be an instruction for the non-engaged personnel to begin engagement with the well construction for one or more wells to perform selected tasks ordered by the task dispatcher 94A. Which tasks and for which well(s) are communicated to the particular user instructed to become engaged with the well construction process will depend on the specific function of the contacted user and the tasks to be performed. In some embodiments, the computer system may communicate to a selected user's mobile communication device (e.g., a smartphone or tablet) in the same manner communication would be established with a terminal forming part of the computer system. The foregoing is shown schematically at 98 in FIG. 5. Thus, a person instructed to begin engagement with the well construction may be enabled to begin performing some or all of the assigned tasks immediately and without regard to the person's physical location. A well construction task prioritization system and method according to the various aspects of the present disclosure may enable more efficient construction of wells, reduced risk adjusted cost of well construction or optimization of construction across a plurality of wells, wherever located and whether or not having common characteristics.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for correcting directional drilling of a wellbore, comprising:

determining, via equipment at a well, a correction to the directional drilling of the wellbore to be performed ahead of a change in drilling fluid flow rate;

applying, by a drilling motor, a torque to a drill pipe to begin the directional drilling;

measuring, by sensors of the equipment, a spatial position of the wellbore at a well segment depth, a pressure of drilling fluid at the wellbore, influx of formation fluid at the wellbore, loss of the drilling fluid at the wellbore, a fracture gradient and pore pressures of subsurface reservoir formations, the drilling fluid flow rate, overpull, and the torque of the drill pipe;

steering, by the equipment, the directional drilling to reduce a difference between the measured spatial position of the wellbore at the well segment depth and a planned position;

determining, by the sensors, that the measured overpull and torque exceed physical limitation thresholds of at least a portion of the equipment, and that an equivalent circulating density (ECD) of the drilling fluid is approaching one of the pore pressures or the fracture gradient of the subsurface reservoir formations and indicative of formation fluid entry into the well or the drilling fluid being lost into one or more of the subsurface reservoir formations;

rescheduling, via the equipment, the change in the drilling fluid flow rate ahead of the directional drilling correction and adjusting an allotted time of the drilling fluid flow rate change; and subsequent to the rescheduling of the drilling fluid flow rate change, determining, by the equipment, that a reduction in the drilling fluid flow rate adversely reduces the ECD below one of the pore pressures of the subsurface reservoir formations, and consequently, as the ECD approaches the fracture gradient of the formations, reducing, by the equipment, the pressure of the drilling fluid by a selected fraction.

2. The method of claim 1 wherein the drilling fluid comprises mud.

3. The method of claim 1 wherein the equipment comprises a logging-while-drilling (LWD) tool.

4. The method of claim 1 wherein the equipment comprises a measurement-while-drilling (MWD) tool.

5. The method of claim 1 wherein the drill pipe is part of a drill string that comprises a drill bit.

6. The method of claim 1 wherein the equipment comprises at least one processor.

7. The method of claim 1 wherein rescheduling comprises adjusting a well plan.

8. The method of claim 1 comprising generating an active task map that comprises at least one drilling-related task.

9. The method of claim 1 wherein the equipment comprises a drilling rig.

10. A system for correcting directional drilling of a wellbore, the system comprising:

a drilling motor configured to:
       apply, a torque to a drill pipe to begin the directional drilling;

sensors configured to:
       measure, a spatial position of the wellbore at a well segment depth, a pressure of drilling fluid at the wellbore, influx of formation fluid at the wellbore, loss of drilling fluid at the wellbore, a fracture gradient and pore pressures of subsurface reservoir formations, drilling fluid flow rate, overpull, and the torque of the drill pipe, and
       determine, that the measured, overpull and torque exceed physical limitation thresholds of at least a portion of equipment at a well, and that an equivalent circulation density (ECD) of the drilling fluid is approaching the fracture gradient or the pore pressure of the subsurface reservoir formations and, correspondingly, that the drilling fluid is being lost into the subsurface formations or that formation fluid has entered the well;

the equipment configured to:
       determine, a correction to the directional drilling of the wellbore to be performed ahead of a change in the drilling fluid flow rate,
       steer, the directional drilling to reduce a difference between the measured spatial position of the wellbore at the well segment depth and a planned position,
       reschedule, the change in the drilling fluid flow rate ahead of the directional drilling correction and adjust an allotted time of the drilling fluid flow rate change, and
       subsequent to the reschedule of the drilling fluid flow rate change, determine, by the equipment, that a reduction in the drilling fluid flow rate adversely reduces the ECD below one of the pore pressures of the subsurface reservoir formations, and consequently, as the ECD approaches the fracture gradient of the formations, reduce, by the equipment, the pressure of the drilling fluid by a selected fraction.

11. The system of claim 10 wherein the drilling fluid comprises mud.

12. The system of claim 10 comprising a logging-while-drilling (LWD) tool.

13. The system of claim 10 comprising a measurement-while-drilling (MWD) tool.

14. The system of claim 10 wherein the drill pipe is part of a drill string that comprises a drill bit.

15. The system of claim 10 wherein the equipment comprises at least one processor.

16. The system of claim 10 wherein the equipment is configured to adjust a well plan.

17. The system of claim 10 wherein the equipment is configured to generate an active task map that comprises at least one drilling-related task.

18. The system of claim 10 comprising a drilling rig.

* * * * *